US010845959B2

(12) United States Patent
Eye et al.

(10) Patent No.: US 10,845,959 B2
(45) Date of Patent: Nov. 24, 2020

(54) GESTURE-BASED WORKFLOW PROGRESSION

(71) Applicant: Boxer, Inc., Austin, TX (US)

(72) Inventors: Andrew Eye, Buda, TX (US); Adam Cianfichi, Newark, DE (US)

(73) Assignee: VMWARE, INC., Palo Alto, CA (US)

( * ) Notice: Subject to any disclaimer, the term of this patent is extended or adjusted under 35 U.S.C. 154(b) by 4 days.

(21) Appl. No.: 16/036,046

(22) Filed: Jul. 16, 2018

(65) Prior Publication Data

US 2018/0321802 A1     Nov. 8, 2018

Related U.S. Application Data

(63) Continuation of application No. 14/199,630, filed on Mar. 6, 2014, now Pat. No. 10,025,459, and a continuation of application No. 15/597,716, filed on May 17, 2017, now Pat. No. 10,649,626.

(60) Provisional application No. 61/781,688, filed on Mar. 14, 2013.

(51) Int. Cl.
*G06F 3/0482*     (2013.01)
*G06F 3/0488*     (2013.01)

(52) U.S. Cl.
CPC ........ *G06F 3/0482* (2013.01); *G06F 3/04883* (2013.01); *G06F 3/0488* (2013.01); *G06F 3/04886* (2013.01)

(58) Field of Classification Search
CPC .. G06F 3/0482; G06F 3/04883; G06F 3/0488; G06F 3/04886
See application file for complete search history.

(56) References Cited

U.S. PATENT DOCUMENTS

| 6,728,947 B1 | 4/2004 | Bengston |
| D597,101 S | 7/2009 | Chaudhri et al. |
| D633,920 S | 3/2011 | Luke et al. |
| D648,344 S | 11/2011 | Arnold |
| D658,678 S | 5/2012 | Gleasman et al. |
| D681,044 S | 4/2013 | Sakata |
| D690,317 S | 9/2013 | Hemeon et al. |
| D695,781 S | 12/2013 | Edwards et al. |

(Continued)

OTHER PUBLICATIONS

Office Action mailed for U.S. Appl. No. 15/148,679.

(Continued)

*Primary Examiner* — Beau D Spratt
(74) *Attorney, Agent, or Firm* — Thomas|Horstemeyer, LLP

(57) ABSTRACT

Methods, systems, and apparatus, including computer programs encoded on a computer storage medium, for displaying, by the one or more processors, at least one graphical representation associated with an electronic document on a touchscreen display; and receiving, by the one or more processors, user input to the at least one graphical representation, the user input indicating a touchscreen gesture to the touchscreen display, and in response: determining a type of the touchscreen gesture; determining a degree of the touchscreen gesture; identifying one or more actions based on the type and the degree, each action of the one or more actions being executable to progress through a workflow; and displaying one or more action elements on the touchscreen display, each action element representing an action of the one or more actions.

20 Claims, 10 Drawing Sheets

(56) References Cited

U.S. PATENT DOCUMENTS

| | | | |
|---|---|---|---|
| D699,743 S | 2/2014 | Arnold et al. |
| D699,744 S | 2/2014 | Ho et al. |
| D703,691 S | 4/2014 | Brinda et al. |
| 8,687,023 B2 | 4/2014 | Markiewicz et al. |
| D709,901 S | 7/2014 | Landis et al. |
| D710,878 S | 8/2014 | Jung |
| D716,338 S | 10/2014 | Lee |
| D717,817 S | 11/2014 | Yu et al. |
| D719,582 S | 12/2014 | Frew et al. |
| 8,935,631 B2 | 1/2015 | Leonard et al. |
| D729,271 S | 5/2015 | Zhang et al. |
| D730,382 S | 5/2015 | Brinda et al. |
| D731,524 S | 6/2015 | Brinda et al. |
| D732,073 S | 6/2015 | Adams |
| 9,063,563 B1 | 6/2015 | Gray et al. |
| D736,246 S | 8/2015 | Zhang et al. |
| D738,394 S | 9/2015 | Chaudhri et al. |
| D738,908 S | 9/2015 | Herold et al. |
| D741,897 S | 10/2015 | Wilkinson et al. |
| D745,020 S | 12/2015 | Mariet et al. |
| D745,038 S | 12/2015 | Abbas |
| D745,531 S | 12/2015 | Lee |
| 9,223,483 B2* | 12/2015 | Thorsander ......... G06F 3/04817 |
| D746,858 S | 1/2016 | Vogt |
| D749,622 S | 2/2016 | Chaudhri et al. |
| D750,097 S | 2/2016 | Kim et al. |
| D753,135 S | 4/2016 | Vazquez |
| D753,140 S | 4/2016 | Kouvas et al. |
| D753,699 S | 4/2016 | Tsukamoto |
| D754,169 S | 4/2016 | Kaplan |
| D757,044 S | 5/2016 | Ostrowski et al. |
| D757,086 S | 5/2016 | Kang |
| D758,420 S | 6/2016 | Zhou |
| D758,446 S | 6/2016 | Lv et al. |
| D759,687 S | 6/2016 | Chang et al. |
| D760,732 S | 7/2016 | Sakai et al. |
| D762,671 S | 8/2016 | Chan et al. |
| D762,683 S | 8/2016 | Eom et al. |
| D762,685 S | 8/2016 | Eom et al. |
| D768,180 S | 10/2016 | Chaudhri et al. |
| D769,280 S | 10/2016 | Bae et al. |
| D771,701 S | 11/2016 | Ostrowski et al. |
| D771,702 S | 11/2016 | Ostrowski et al. |
| D772,292 S | 11/2016 | Ostrowski et al. |
| D773,481 S | 12/2016 | Everette et al. |
| D776,692 S | 1/2017 | Armstrong |
| D778,939 S | 2/2017 | Caro et al. |
| D780,801 S | 3/2017 | Jann et al. |
| D783,648 S | 4/2017 | Vazquez et al. |
| D793,424 S | 8/2017 | Bao et al. |
| D794,045 S | 8/2017 | Akana et al. |
| D795,281 S | 8/2017 | Kim et al. |
| D797,133 S | 9/2017 | Marcolongo et al. |
| D801,362 S | 10/2017 | Wang et al. |
| D804,521 S | 12/2017 | Deets |
| D804,522 S | 12/2017 | Sachtleben et al. |
| D806,717 S | 1/2018 | Bae et al. |
| D807,916 S | 1/2018 | Kim |
| D808,413 S | 1/2018 | Wu et al. |
| D809,003 S | 1/2018 | Sowden et al. |
| D816,110 S | 4/2018 | Choi et al. |
| D817,975 S | 5/2018 | Kim et al. |
| D820,880 S | 6/2018 | Vairamohan |
| 10,025,459 B2 | 7/2018 | Eye et al. |
| D827,657 S | 9/2018 | Cuebas et al. |
| D830,373 S | 10/2018 | Gupta et al. |
| D847,831 S | 5/2019 | Alvarez et al. |
| D847,855 S | 5/2019 | Majernik et al. |
| D848,458 S | 5/2019 | Rocha et al. |
| 2004/0075695 A1 | 4/2004 | Chew et al. |
| 2005/0052458 A1 | 3/2005 | Lambert |
| 2008/0155480 A1 | 6/2008 | Van et al. |
| 2010/0192102 A1 | 7/2010 | Chmielewski et al. |
| 2010/0295805 A1 | 11/2010 | Shin et al. |
| 2010/0299599 A1* | 11/2010 | Shin ..................... G06F 3/0482 715/702 |
| 2011/0187660 A1 | 8/2011 | Hirata et al. |
| 2011/0252349 A1 | 10/2011 | Chaudhri |
| 2011/0320978 A1 | 12/2011 | Horodezky et al. |
| 2012/0126940 A1 | 5/2012 | Coggill |
| 2012/0133677 A1 | 5/2012 | Suzuki et al. |
| 2012/0159336 A1 | 6/2012 | Norwood |
| 2012/0284673 A1 | 11/2012 | Lamb et al. |
| 2012/0293456 A1 | 11/2012 | Ikeda et al. |
| 2012/0327122 A1 | 12/2012 | Imamura |
| 2013/0002578 A1 | 1/2013 | Ito et al. |
| 2013/0019173 A1 | 1/2013 | Kotler et al. |
| 2013/0019182 A1 | 1/2013 | Gil et al. |
| 2013/0019205 A1 | 1/2013 | Gil et al. |
| 2013/0033525 A1 | 2/2013 | Markiewicz et al. |
| 2013/0055170 A1 | 2/2013 | Langlois et al. |
| 2013/0067420 A1 | 3/2013 | Pittappilly et al. |
| 2013/0086056 A1 | 4/2013 | Dyor et al. |
| 2013/0145366 A1 | 6/2013 | Newell et al. |
| 2013/0159941 A1 | 6/2013 | Langlois et al. |
| 2013/0182016 A1 | 7/2013 | Gan |
| 2013/0185650 A1 | 7/2013 | Gutowitz |
| 2013/0241852 A1 | 9/2013 | McCormack et al. |
| 2013/0267310 A1 | 10/2013 | Sakaguchi et al. |
| 2014/0033032 A1* | 1/2014 | Reynolds ................. G06F 3/048 715/702 |
| 2014/0068493 A1 | 3/2014 | Moon et al. |
| 2014/0071063 A1* | 3/2014 | Kuscher .................. G06F 3/041 345/173 |
| 2014/0082534 A1* | 3/2014 | Cleron .................... G06F 3/048 715/764 |
| 2014/0115455 A1 | 4/2014 | Kim |
| 2014/0143683 A1 | 5/2014 | Underwood et al. |
| 2014/0223347 A1* | 8/2014 | Seo ....................... G06F 3/0482 715/769 |
| 2014/0280616 A1 | 9/2014 | Ramanathan et al. |
| 2014/0282243 A1 | 9/2014 | Eye et al. |
| 2015/0046828 A1 | 2/2015 | Desai et al. |
| 2015/0067582 A1 | 3/2015 | Donnelly et al. |
| 2015/0339373 A1 | 11/2015 | Carlson et al. |
| 2017/0277382 A1 | 9/2017 | Guo |
| 2017/0278069 A1 | 9/2017 | Guo |
| 2017/0364213 A1 | 12/2017 | Vairamohan |

OTHER PUBLICATIONS

Office Action mailed for U.S. Appl. No. 15/184,679.
Office Action mailed for U.S. Appl. No 15/597,716.
Notice of Allowance mailed for U.S. Appl. No. 15/597,716.
"Campus Payment-Time." dribbble.com. Dec. 22, 2013. Accessed Feb. 6, 2018. Available online at URL: https://dribbble.com/shots/1355637-Capmus-payment-Time.
"iOS UI Kit Calendar." sketchappsources.com, accessed and retrieved via Internet Archive Wayback Machine. Available Jul. 7, 2014 Accessed Feb. 6, 2018. Available online via URL: https://web.archive.org/web/20140707164908/https://www.sketchappsources.com/free-source/602-ios-ui-kit-calendar-sketch-freebie-resource.html.
"Learn Future Events." mobilemonitor.com, accessed and date retrieved via Internet Archive Wayback Machine. Available Jan. 24, 2012. Accessed Oct. 25, 2017. Available online via URL: https://web.archive.org/web/20120124061621/htlp://www.mobilemonitor.com/features/events-calendar.
Chalvet, Barthelemy. "Calendar Modal." dribbble.com. Sep. 30, 2013. Accessed Oct. 25, 2017. Available online at URL: https://dribbble.com/shots/1254349-Calendar-Modal.
Craven, Kyle. "iOS 7 Calendar App Redesign." dribbble.com. Jun. 25, 2013. Accessed Feb. 6, 2018. Avaliable online at URL: https://dribbble.com/shots/1129981-iOS-7-Calendar-App-Redesign.
Pier Francesco Piccolomini "Mailbox not your average iOS mail client" p. 9 (Year. 2014).
Riley, Kaylee. "Proctrasinators Seek Help Before the Last Minute." theaviso.org. Feb. 12, 2013. Accessed Oct. 25, 2017. Available

(56) References Cited

OTHER PUBLICATIONS online at URL: htlp://theaviso.org/2013/02/12/procrastinators-seek-help-before-the-last-minute/.

* cited by examiner

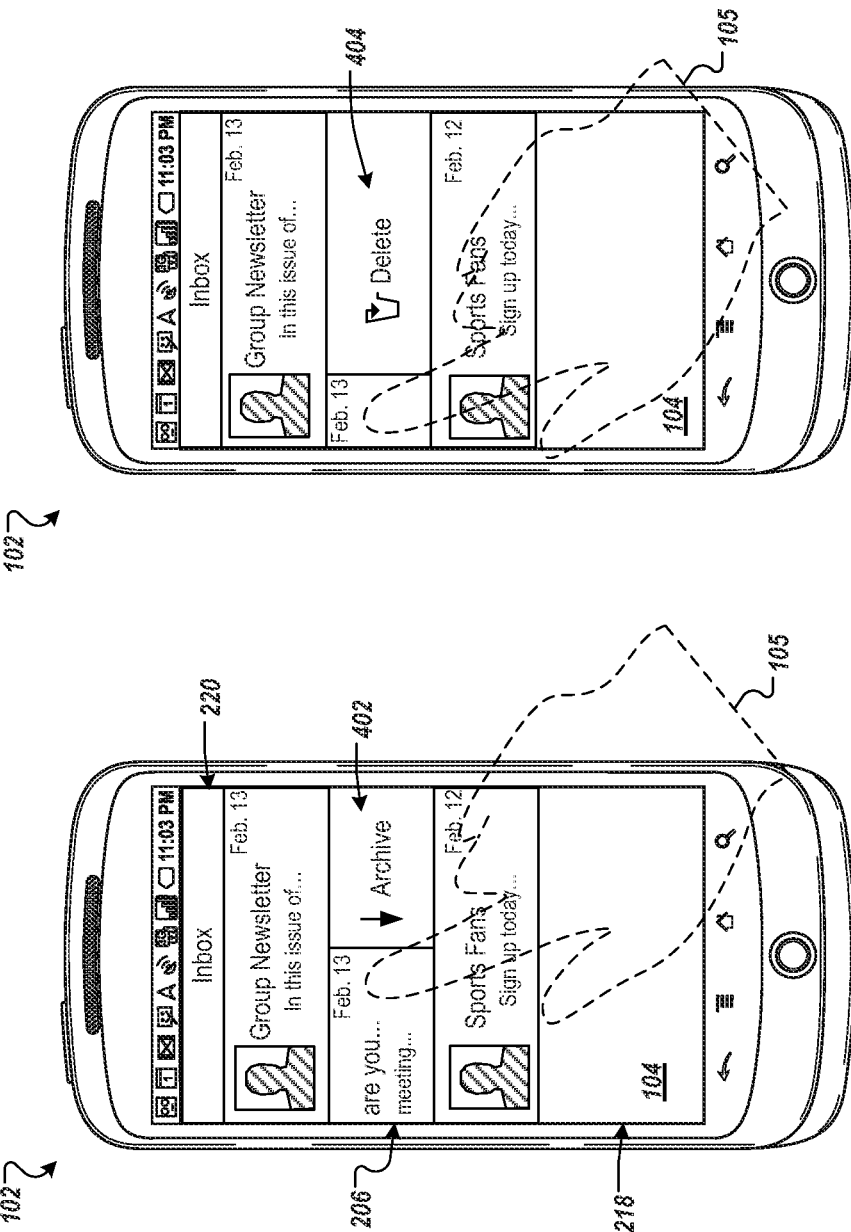

GESTURE-BASED WORKFLOW PROGRESSION

CROSS-REFERENCE TO RELATED APPLICATIONS

This application is a continuation of and claims the benefit of U.S. patent application Ser. No. 14/199,630, entitled "GESTURE-BASED WORKFLOW PROGRESSION," and filed Mar. 6, 2014. This application is a continuation of and claims the benefit of U.S. patent application Ser. No. 15/597,716, entitled "GESTURE-BASED WORKFLOW PROGRESSION," filed May 17, 2017. This application claims the benefit of U.S. Provisional Application Ser. No. 61/781,688, filed on Mar. 14, 2013. All of the above applications are expressly incorporated herein by reference in their entireties.

BACKGROUND

Mobile computing continues to grow quickly as mobile computing devices, such as smart phones, add more power and more features. Users of such devices launch various applications, including task-based or task-centric applications, through the mobile computing devices. The task-based applications can assist a user of the mobile computing device in organizing tasks that the user is interested in.

SUMMARY

Innovative aspects of the subject matter described in this specification may be embodied in methods that include actions of displaying, by the one or more processors, at least one graphical representation associated with an electronic document on a touchscreen display; and receiving, by the one or more processors, user input to the at least one graphical representation, the user input indicating a touchscreen gesture to the touchscreen display, and in response: determining a type of the touchscreen gesture; determining a degree of the touchscreen gesture; identifying one or more actions based on the type and the degree, each action of the one or more actions being executable to progress through a workflow; and displaying one or more action elements on the touchscreen display, each action element representing an action of the one or more actions.

Other implementations of these aspects include corresponding systems, apparatus, and computer programs, configured to perform the actions of the methods, encoded on computer storage devices.

These and other implementations may each optionally include one or more of the following features: receiving user input to an action element and, in response, executing a respective action to progress through the workflow; the type is based on a direction of the touchscreen gesture relative to the touchscreen display; determining the type of the touchscreen gesture includes: determining a direction of the touchscreen gesture relative to the touchscreen display, in response to determining a first direction of the touchscreen gesture, determining that the touchscreen gesture is a positive touchscreen gesture type, and in response to determining a second direction of the touchscreen gesture, determining that the touchscreen gesture is a negative touchscreen gesture type; the second direction is opposite to the first direction; the first direction is a left-to-right direction relative to the touchscreen display, and the second direction is a right-to-left direction relative to the touchscreen display; the degree is based on a length of the touchscreen gesture relative to the touchscreen display; determining the degree of the touchscreen gesture includes: in response to determining that the touchscreen gesture is the positive touchscreen gesture type: determining a length of the touchscreen gesture, comparing the length to a first threshold, in response to determining that the length is greater than the first threshold: comparing the length to a second threshold, in response to determining that the length is less than the second threshold, displaying a first action element on the touchscreen display, and in response to determining that the length is greater than the second threshold, displaying a second action element on the touchscreen display; the second threshold is greater than the first threshold; determining that the length is less than the second threshold further includes: creating a task associated with the electronic document in response to completion of receiving the user input; the task is associated with a task data record, the task data record including one or more fields, with data of the one or more fields populated with data associated with one or more fields of a document data record associated with the electronic document; the task data record includes a title field, an assignee field, and an assignor field, the title field populated with data associated with a subject field of the document data record, the assignee field populated with data associated with a recipient field of the document data record, and the assignor field populated with data associated with a sender field of the document data record; the title field is populated with user-generated data; creating the task further includes adding one or more fields to a document data record associated with the electronic document, the one or more fields based on the task; the one or more fields include a priority field, a due date field, and an assignee field; the task data record is associated with a task data record, the method further including: synchronizing one or more fields of the document data record with one or more fields of the task data record; in response to creating the task: displaying one or more additional action elements on the touchscreen display, each additional action element representing an additional action of the one or more additional actions; the one or more additional action elements include a more action element and an undo action element; in response to receiving user input selecting the more action element, displaying one or more secondary action elements on the touchscreen display, the one or more secondary action elements including a task action element, a due date action element, and an assignee action element; determining the degree of the touchscreen gesture includes: in response to determining the that the touchscreen gesture is the negative touchscreen gesture type: determining a length of the touchscreen gesture, comparing the length to a third threshold, in response to determining that the length is greater than the third threshold: comparing the length to a fourth threshold, in response to determining that the length is less than the fourth threshold, displaying a third action element on the touchscreen display, and in response to determining that the length is greater than the fourth threshold, displaying a fourth action element on the touchscreen display; the fourth threshold is greater than the third threshold; the workflow includes a plurality of events for generating a task based on the electronic document; the third action element is an archive action element, and the fourth action element is a delete action element.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 4A, 4B and 4C graphically depict a second gesture-based workflow progression.

Like reference numbers represent corresponding parts throughout.

DETAILED DESCRIPTION

Implementations of the present disclosure are generally directed to gesture-based workflow progressions. Specifically, a user provides input through a touchscreen interface of a mobile computing device, e.g., a smartphone. The touchscreen interface can provide graphical representations of electronic documents, e.g., tasks or e-mails, for display. The user input can include touchscreen gestures to the graphical representations, including swiping the graphical representations across the touchscreen interface. By providing the touchscreen gesture, e.g., swiping, to the graphical representation, action elements are presented on the touchscreen interface and/or actions associated with the action elements are performed based on a type and a degree of the touchscreen gesture.

Figure 1:
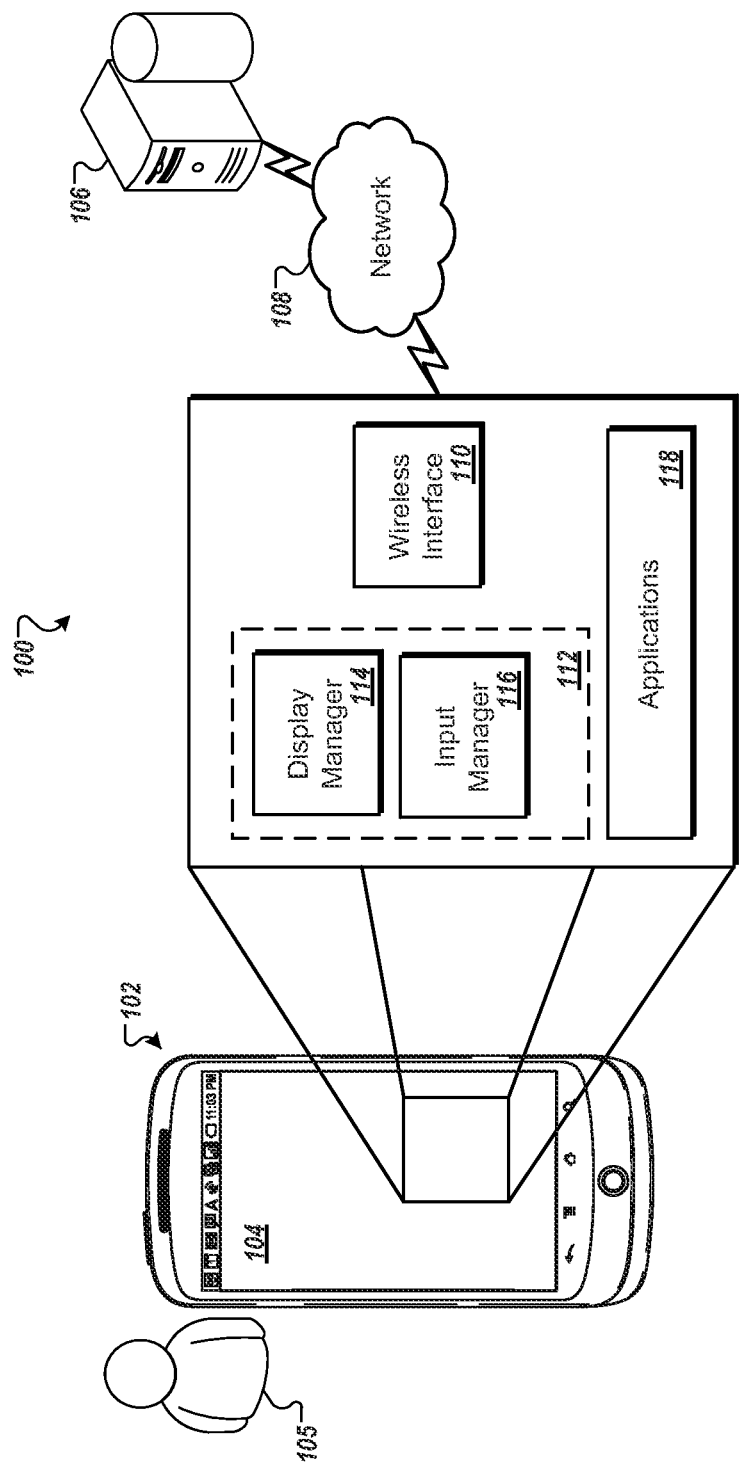
FIG. 1 depicts an example system that can execute implementations of the present disclosure.

FIG. 1 depicts an example system 100 that can execute implementations of the present disclosure. In general, the system 100 includes a mobile computing device 102, e.g., a smartphone, a tablet computing device, a touchscreen laptop, a touchscreen desktop, with a touchscreen display 104. It is appreciated, however, that implementations of the present disclosure can be used with other computing devices having touchscreen displays. In some examples, the touchscreen display 104 can provide one or more graphical user interfaces (GUIs) for the mobile computing device 102. In some examples, and as discussed in further detail below, the touchscreen display 104 can provide one or more screens on which graphical representations, e.g., of an electronic document, can be displayed to a user. A number of components within the mobile computing device 102 provide for interaction with the mobile computing device 102. For purposes of clarity, FIG. 1 shows certain example components of the mobile computing device 102. A user 105 can be a user of the mobile computing device 102.

In some implementations, the mobile computing device 102 can communicate with a server system 106 through a network 108, e.g., using a wireless interface 110. The network 108 can be the Internet and/or a cellular network. For example, the mobile computing device 102 can direct telephone calls through a telephone network or through a data network using voice over internet protocol (VOIP). In some examples, the mobile computing device 102 can transmit other forms of data over the Internet, for example, data in the form of Hypertext Transfer Protocol (HTTP) requests that are directed at particular web sites. The mobile computing device 102 may receive responses, for example, in forms that can include, but are not limited to, a markup code for generating web pages, media files, and electronic messages.

A number of components executed by one or more processors included in the mobile computing device 102 enable the user 105 to interact with the touchscreen display 104 to provide input and to receive visual and/or audible output. For example, an interface manager 112 can manage interaction with the touchscreen display 104, and includes a display manager 114 and an input manager 116. The display manager 114 can manage the information displayed to the user 105 using the touchscreen display 104. For example, an operating system running on the mobile computing device 102 can use the display manager 114 to arbitrate access to the touchscreen display 104 for a number of applications 118 running on the mobile computing device 102. The mobile device 102 can provide visual feedback. For example, visual feedback can be provided using the display manager 114 to display graphical representations on the touchscreen display 104.

Figures 2A, 2B:
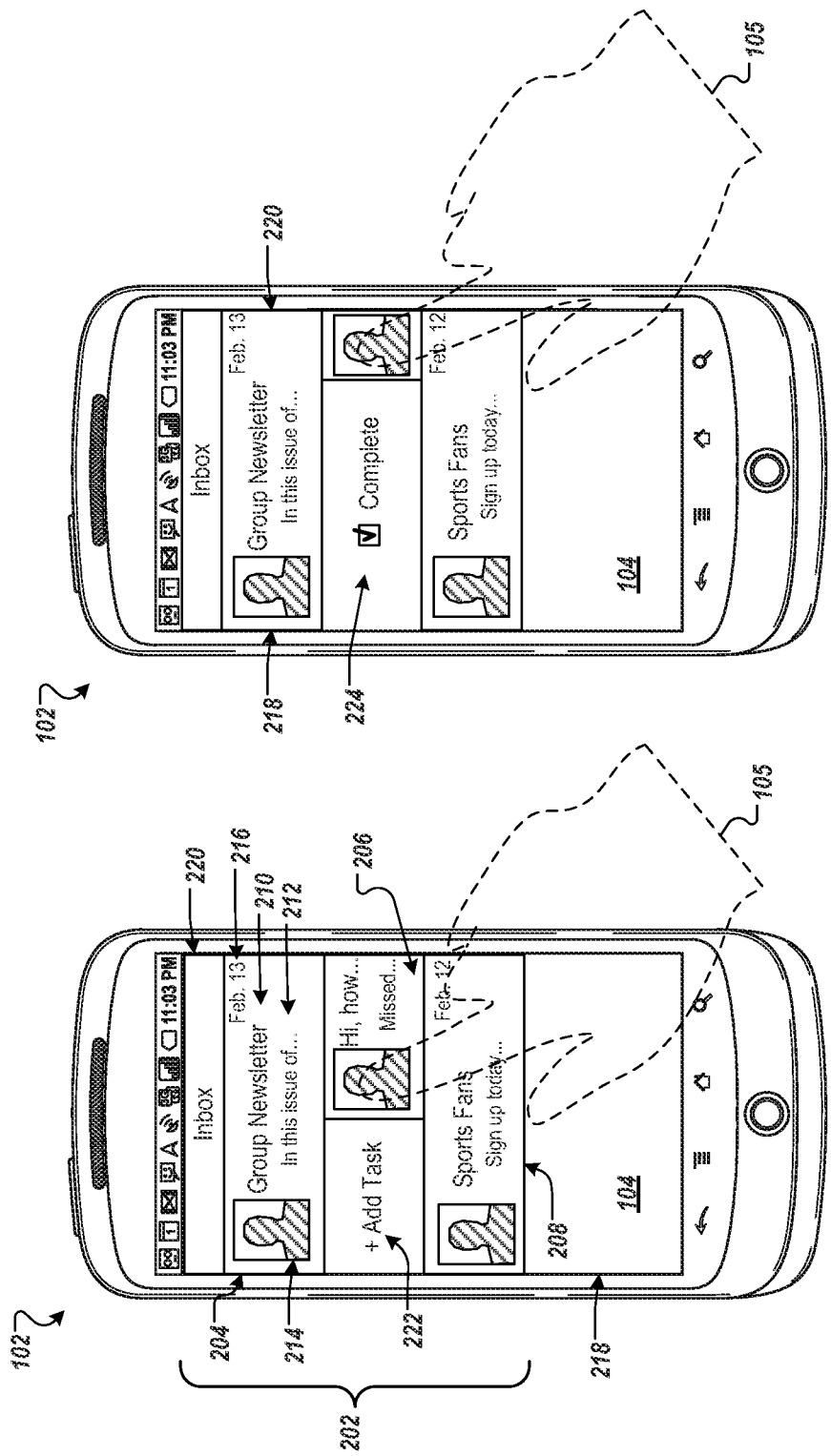
FIGS. 2A and 2B graphically depict a first gesture-based workflow progression

FIGS. 2A and 2B graphically depict a first gesture-based workflow progression. Specifically, the touchscreen display 104 displays a graphical representation of an electronic document inbox 202 associated with the user 105, the electronic document inbox 202 including, or being associated with, one or more electronic documents. In some examples, the electronic documents can include e-mails or tasks and the electronic document inbox 202 can include an e-mail inbox or a task inbox. In some examples, the electronic document inbox 202 is associated with an application 118.

The touchscreen display 104 can display one or more graphical representations 204, 206, 208 each associated with an electronic document. In some examples, one of the graphical representations 204, 206, 208 can be associated with two or more electronic documents, e.g., an e-mail conversation thread. Each of the graphical representations 204, 206, 208 can include a title portion 210, a body portion 212, an associated entity 214, and date 216. However, for simplicity of illustration, the title portion 210, the body portion 212, the associated entity 214, and the date 216 are shown only for the graphical representation 204. The title portion 210 includes at least a portion of a title of the associated electronic document, e.g., the subject field of an e-mail; the body portion 212 includes at least a portion of a body of the associated electronic document, e.g., the content of the e-mail; the associated entity 214 includes data associated with a person associated with the associated electronic document, e.g., the sender of the e-mail; and the date 216 includes a date of the electronic document, e.g., the date the e-mail was sent.

The user 105 can provide input to at least one of the graphical representations 204, 206, 208. The input can include a touchscreen gesture, e.g., a gesture provided by the user 105 with the touchscreen display 104. In some examples, the user 105 selects one of the graphical representations 204, 206, 208, for example, by providing a "press and hold" user input. For example, the user 105 selects the graphical representation 206. The touchscreen gesture can be associated with a type, and a degree. For example, the user 105 provides a positive touchscreen gesture type to the graphical representation 206 by selecting the graphical representation 206, e.g., providing a "press" gesture. Further, the positive touchscreen gesture type includes providing a continuous, sliding contact with the graphical representation 206 in a first direction such that a "sliding" animation of the graphical representation 206 is provided. For example, the graphical representation 206 is slid from a first side 218 of the touchscreen display 104 towards a second side 220 of the touchscreen display. In some examples, the first direction is a "left-to-right" direction relative to the touchscreen display 104, e.g., relative to a normal viewing position of the touchscreen display 104 by the user 105. In some examples, the first direction is a "right-to-left" direction relative to the touchscreen display 104, e.g., relative to a normal viewing position of the touchscreen display 104 by the user 105.

In some examples, as the graphical representation 206 is slid from the first side 218 to the second side 220, portions of the graphical representation 206 disappear from display. For example, displayed data of the graphical representation 206 adjacent the second side 220 disappears from display. That is, data associated with the title portion 210, the body portion 212, the associated entity 214, and the date 216 of the graphical representation 206 can be removed from display, or truncated.

In some implementations, the degree associated with the touchscreen gesture is based on a length of the touchscreen gesture relative to the touchscreen display 104. In some examples, the length of the touchscreen gesture is an absolute measure of the length of the touchscreen gesture. For example, the length of the touchscreen gesture is the length of the user input from initial contact with the graphical representation 206 to a cessation of contact with the graphical representation 206, e.g., a length of the "press, slide, and release" user input.

The degree of the positive touchscreen gesture can be compared to a first threshold. Specifically, the length of the positive touchscreen gesture can be compared to the first threshold. In some examples, the first threshold can be a threshold length, e.g., one inch. In some examples, the first threshold can be based on a percentage length of a dimension of the touchscreen display 104, e.g., 20% of a length defined between the first side 218 and the second side 220.

To that end, the user 105 provides a positive touchscreen gesture to the graphical representation 206 having a degree greater than the first threshold. In response, in some examples, the touchscreen display 104 displays an Add Task action element 222. The Add Task action element 222 represents an action that can be performed. For example, the Add Task action element 222 is associated with a creation of a task action, described further below. In some examples, the action associated with the Add Task action element 222 is automatically performed when the Add Task action element 222 is displayed, and the user ceases contact with the graphical representation 206. In some examples, the user 105 selects the Add Task action element 222 to perform the action associated with the Add Task action element 222.

Referring to FIG. 2B, the user 105 can provide further, e.g., additional, input by providing additional touchscreen gestures, and specifically, further providing continuous, sliding contact with the graphical representation 206 in the first direction. Particularly, the positive touchscreen gesture provided by the user 105, e.g., as in FIG. 2A, is extended such that a degree of the positive touchscreen gesture is greater than a second threshold.

In response to the degree of the positive touchscreen gesture being greater than the second threshold, the touchscreen display 104 displays a Complete action element 224. The Complete action element 224 represents an action. For example, the Complete action element 224 is associated with a completion of a task action, described further below.

In some examples, the action associated with the Complete action element 224 is automatically preformed when the Complete action element 224 is displayed, and the user 105 ceases contact with the graphical representation 206. In some examples, the user 105 selects the Complete action element 224 to perform the action associated with the Complete action element 224.

In some implementations, as the user 105 is providing further input such that the degree of the positive touchscreen gesture is greater than the second threshold, the Add Task action element 222 is faded, e.g., faded from it's original, or full, intensity, to a lesser intensity, or transparent. In some examples, the Add Task action element 222 is faded concurrently with the user 105 providing the positive touchscreen gesture greater than the second threshold. In some implementations, as the user 105 is providing further input such that the degree of the positive touchscreen gesture is greater than the second threshold, the Complete action element 224 can be animated across the touchscreen display 104 from the second side 220 to the first side 218.

It should be appreciated that other types of action elements, e.g., the action elements 222, 224 can be presented, e.g., based on a type of workflow. In some examples, the types of action elements can be contextual action elements, e.g., based on the type of workflow. For example, the action elements 222, 224 can be based on a purchase order workflow. In some examples, the action element 222 can include an Approval action element 222 and the action element 2224 can include a Reject action element 224.

Figures 3A, 3B:
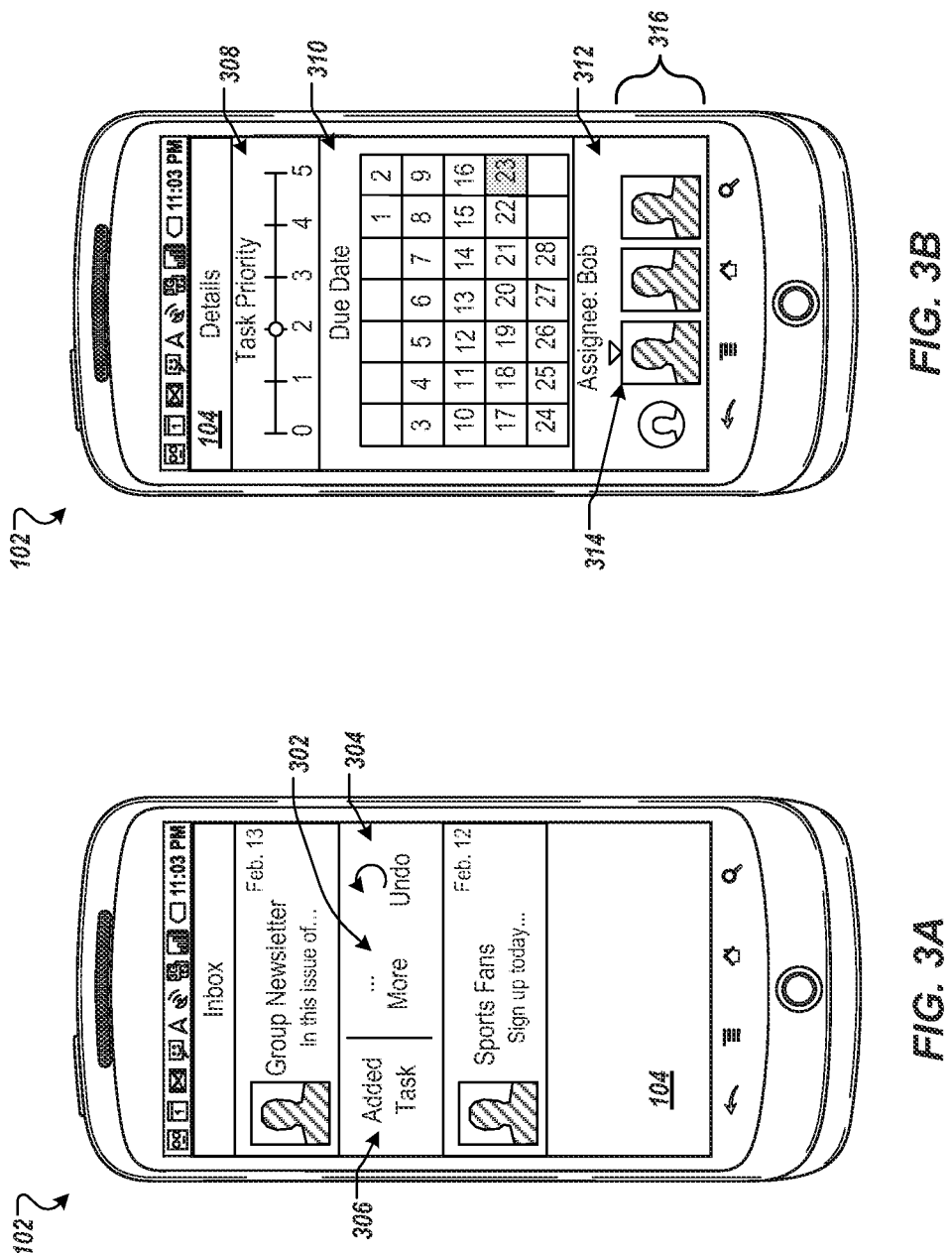
FIGS. 3A and 3B graphically depict a continuation of the first gesture-based workflow progress.

FIGS. 3A and 3B graphically depict a continuation of the first gesture-based workflow progress. Specifically, in response to the positive touchscreen gesture being greater than the first threshold, as well as less than the second threshold, and completion of the user input, a task is created that is associated with the electronic document represented by the graphical representation 206. In some examples, creating the task can further include appending additional metadata to the electronic document represented by the graphical representation 206, described further below.

Additionally, in response to the positive touchscreen gesture being greater than the first threshold, as well as less than the second threshold, and completion of the user input, the touchscreen display 104 displays one or more additional action elements 302, 304. Each of the additional action elements 302, 304 represents an additional action. Specifically, the More action element 302 and the Undo action element 304 are displayed. For example, the More action element 302 is associated with adjusting properties associated with the task; and the Undo action element 304 is associated with returning the task, or electronic document represented by the graphical representation 206, to a previous state. Furthermore, the touchscreen display 104 can display a notification 306, the notification 306 representing a confirmation of the action of creating a task associated with the Complete action element 224.

In some implementations, in response to the positive touchscreen gesture being greater than the second threshold, and completion of the user input, a task is marked, e.g., tagged, as completed that is associated with the electronic document that is represented by the graphical representation 206. In some examples, completing the task can further include updating metadata of the electronic document represented by the graphical representation 206, described further below.

Additionally, in response to the positive touchscreen gesture being greater than the second threshold, and completion of the user input, the touchscreen display 104 displays one or more additional action elements similar to the action elements 302, 304. Furthermore, the touchscreen display 104 can display a notification similar to the notification 306, the notification representing a confirmation of the completion of the task associated with the Complete action element 224.

Referring to FIG. 3B, after selection by the user 105 of the More action element 302, the touchscreen display 104 displays secondary action elements 308, 310, 312 that are each associated with a property of the task that is associated with the electronic document that is represented with the graphical representation 206. Specifically, the Task Priority action element 308 represents a Task Priority property associated with the task; the Due Date action element 310 represents a Due Date property associated with the task; and the Assignee action element 312 represents an Assignee property associated with the task.

The user 105 can provide input to one or more of the secondary action elements 308, 310, 312 to adjust the values of the properties associated with the respective secondary action element 308, 310, 312. For example, the user 105 can provide input to the Task Priority action element 308, including, adjusting a task priority associated with the task, e.g., assigning a priority of two. Additionally, for example, the user 105 can provide input to the Due Date action element 310, including, selecting a desired completion date to be associated with the task, e.g., February 23. Additionally, for example, the user 105 can provide input to the Assignee action element 312, including, assigning, or delegating, the task.

In some examples, with respect to the Assignee action element 312, the user 105 selects one or more entities, or persons, to be assigned the task. For example, the user 105 selects the entity 314 to be assigned the task, that is, the Assignee property is updated to be associated with data associated with the entity 314, e.g., a name associated with the entity 314. In some examples, the user 105 can select two or more entities, or persons, to be assigned the task. In some examples, the user 105 can assign the task to themself. In some examples, the user 105 can assign the task to two or more entities, one of the entities including the user 105.

In some implementations, the Assignee action element 312 includes for display suggested entities 316 to assign the task to. For example, the mobile computing device 102, the server system 106, or both, determine the suggested entities 316. In some examples, the suggested entities 316 are based on entities associated with the electronic document that is associated with the task. For example, the suggested entities 316 can include a sender or receiver of the electronic document, e.g., an e-mail, or entities that are associated with a carbon copy or blind carbon copy field of the e-mail. In some examples, the suggested entities 316 are based on historical assignments of tasks by the user 105. For example, the suggested entities 316 can include entities that the user 105 has assigned to the most historically, e.g., the top three assignees by the user 105.

Figure 3C:
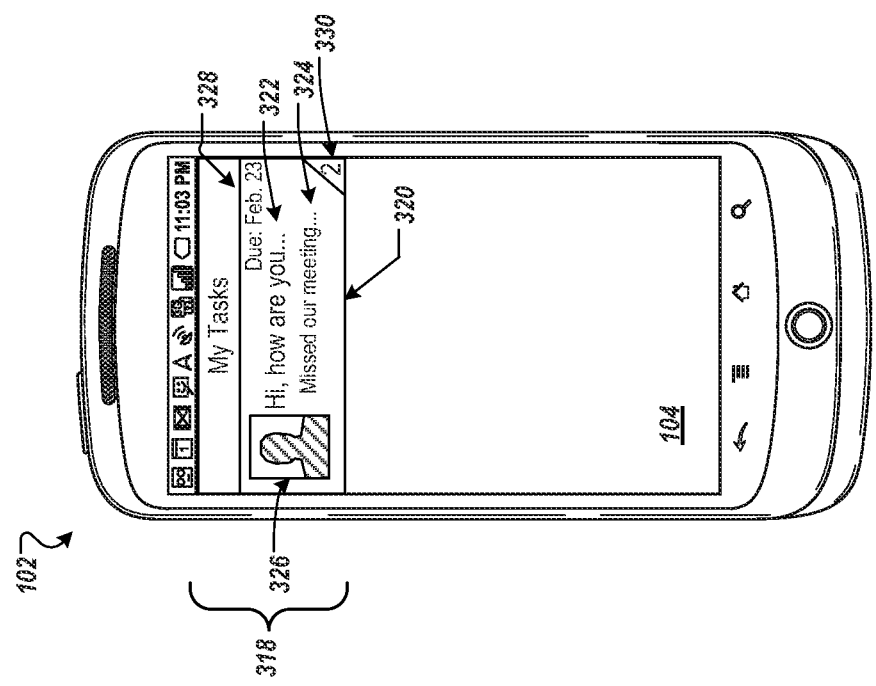
FIG. 3C graphically depicts a graphical representation of a task inbox associated with a user of the mobile computing device.

FIG. 3C graphically depicts a graphical representation of a task inbox 318 associated with the user 105. Specifically, the task inbox 318 includes a graphically depiction of tasks that are associated with the user 105. For example, as mentioned above, in response to creating the task that is associated with the electronic document represented by the graphical representation 206, and with the Assignee property of the task associated with the user 105, a graphical representation 320 of the task is displayed within the task inbox 318. The user can navigate to the task inbox 318 by any number of methods, including selecting the task inbox 318 from a pull down menu.

The graphical representation 320 can include a title portion 322, a body portion 324, an assignee portion 326, a due date 328, and a priority 330. The title portion 322 includes at least a portion of the title of the associated task; the body portion 322 includes at least a portion of the body of the associated task; the assignee portion 326 includes an entity that is assigned to the task; the due date 328 includes a due date of the task; and the priority 330 includes a propriety of the task. In some implementations, data associated with the title portion 322, the body portion 324, the assignee portion 326, the due date 328, the task 330 can be populated with data associated with the electronic document represented by the graphical representation 206, described further below.

In some implementations, the tasks of the task inbox 318 can be sorted by any appropriate metric, including the assignee of the task, the priority of the task, and the due date of the task. In some implementations, the touchscreen interface 104 can further display similar graphical representations of an assigned, or delegated, task inbox and a completed task inbox.

Figure 4C:
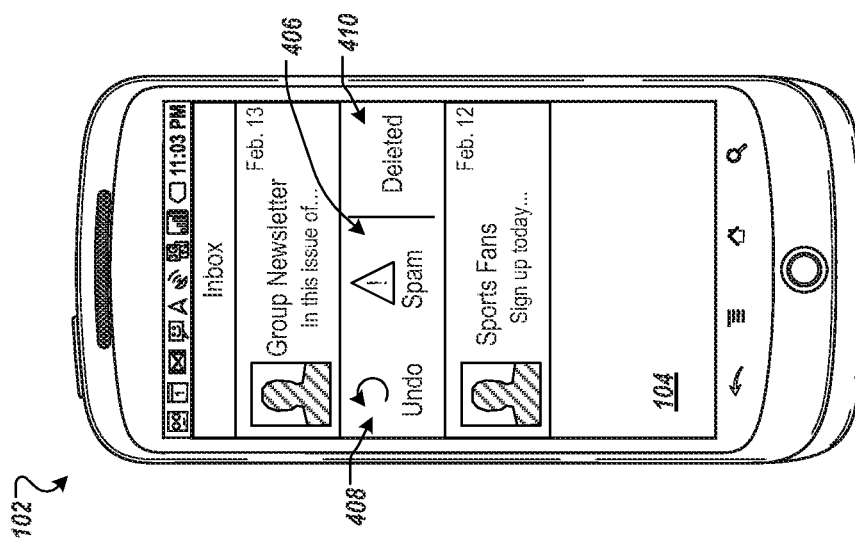

FIGS. 4A, 4B and 4C graphically depict a second gesture-based workflow progression. Specifically, the user 105 provides a negative touchscreen gesture type to the graphical representation 206 by selecting the graphical representation 206, e.g., providing a "press" gesture. Further, the negative touchscreen gesture type includes providing a continuous, sliding contact with the graphical representation 206 in a second direction such that a "sliding" animation of the graphical representation 206 is provided. For example, the graphical representation 206 is slid from the second side 220 of the touchscreen display 104 towards the first side 218 of the touchscreen display 104. In some examples, the second direction is opposite to the first direction. In some examples, the second direction is a "right-to-left" direction relative to the touchscreen display 104, e.g., relative to a normal viewing position of the touchscreen display 104 by the user 105. In some examples, the second direction is a "left-to-right" direction relative to the touchscreen display 104, e.g., relative to a normal viewing position of the touchscreen display 104 by the user 105. In some examples, the second direction is opposite the first direction.

In some examples, as the graphical representation 206 is slid from the second side 220 to the first side 218, portions of the graphical representation 206 disappear from display. For example, displayed data of the graphical representation 206 adjacent the first side 218 disappears from display. That is, data associated with the title portion 210, the body portion 212, the associated entity 214, and the date 216 of the graphical representation 206 can be removed from display, or truncated.

The degree of the negative touchscreen gesture can be compared to a third threshold. Specifically, the length of the negative touchscreen gesture can be compared to the third threshold. In some examples, the third threshold can be a threshold length, e.g., one inch. In some examples, the third threshold can be based on a percentage length of a dimension of the touchscreen display 104, e.g., 20% of a length defined between the first side 218 and the second side 220. In some examples, the third threshold is substantially the same as the first threshold.

To that end, the user 105 provides a negative touchscreen gesture to the graphical representation 206 having a degree greater than the third threshold. In response, the touchscreen display 104 displays an Archive action element 402. The Archive action element 402 represents an action that can be performed. For example, the Archive action element 402 is associated with archiving of the electronic document represented by the graphical representation 206, e.g., updating the metadata of the electronic document to include an archive status. In some examples, the action associated with the Archive action element 402 is automatically preformed when the Archive action element 402 is displayed, and the user 105 ceases contact with the graphical representation 206. In some examples, the user 105 selects the Archive action element 402 to perform the action associated with the Archive action element 402.

Referring to FIG. 4B, the user 105 can provide further input by providing additional touchscreen gestures, and specifically, further providing continuous, sliding contact with the graphical representation 206 in the second direction. Particularly, the negative touchscreen gesture provided by the user, e.g., as in FIG. 4A, is extended such that a degree of the negative touchscreen gesture is greater than a fourth threshold.

In response to the degree of the negative touchscreen gesture being greater than the fourth threshold, the touchscreen display 104 displays a Delete action element 404. The Delete action element 404 represents an action that can be performed. For example, the Delete action element 404 is associated with a deletion of the electronic document represented by the graphical representation 206, e.g., updating the metadata of the electronic document to include a delete status. In some examples, the action associated with the Delete action element 404 is automatically preformed when the Delete action element 404 is displayed, and the user 105 ceases contact with the graphical representation 206. In some examples, the user 105 selects the Delete action element 404 to perform the action associated with the Delete action element 404.

In some implementations, as the user 105 is providing further input such that the degree of the negative touchscreen gesture is greater than the fourth threshold, the Archive action element 402 is faded, e.g., faded from it's original, or full, intensity, to a lesser intensity, or transparent. In some examples, the Archive action element 402 is faded concurrently with the user 105 providing the negative touchscreen gesture greater than the fourth threshold. In some implementations, as the user 105 is providing further input such that the degree of the negative touchscreen gesture is greater than the fourth threshold, the Delete action element 402 can be animated across the touchscreen display 104 from the first side 218 to the second side 220.

FIG. 4C graphically depicts a continuation of the second gesture-based workflow progress. Specifically, in response to the negative touchscreen gesture being greater than the fourth threshold, and completion of the user input, the touchscreen display 104 displays one or more additional action elements 406, 408. Each of the additional action elements 406, 408 represents an additional action. Specifically, the Spam action element 406 and the Undo action element 408 are displayed. For example, the Spam action element 406 is associated with marking the electronic document represented by the graphical representation 206 as "spam", e.g., updating the metadata of the electronic document to include a "spam" status; and the Undo action element 408 is associated with returning the task, or electronic document represented by the graphical representation 206, to a previous state. Furthermore, the touchscreen display 104 can further display a notification 410, the notification 410 representing a confirmation of the action of deleting the electronic document represented by the graphical representation 206.

In some implementations, in response to the negative touchscreen gesture being greater than the third threshold, as well as less than the fourth threshold, and completion of the user input, the touchscreen display 104 displays one or more additional action elements similar to the action elements 406, 408. Furthermore, the touchscreen display 104 can further display a notification similar to the notification 410, the notification representing a confirmation of the archiving of the task associated with the Archive action element 402.

Figure 5:
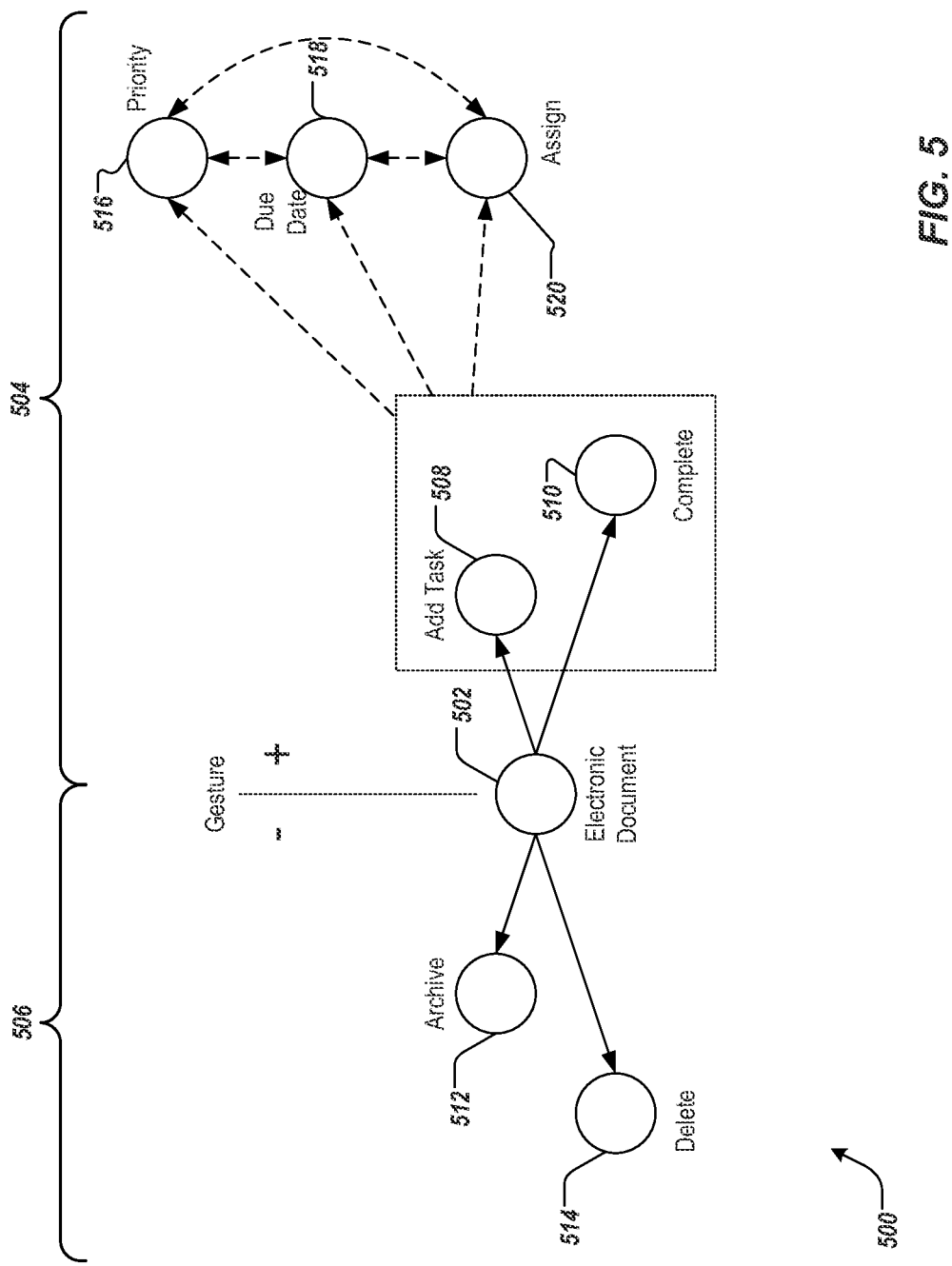
FIG. 5 graphically depicts a workflow graph for a gesture-based workflow progression.

FIG. 5 graphically depicts a workflow graph 500 for a gesture-based workflow progression. Specifically, the workflow graph 500 can include nodes that represent events and edges that represent gestures between the events. For example, node 502 represents reception of an electronic document, e.g., an e-mail. Reception of the electronic document can include identification of the electronic document, e.g., by a task-based application, of applications 118, executing on the mobile computing device 102. A user, e.g., the user 105, can provide user input to the event, including providing touchscreen gestures with respect to a graphical representation, e.g., the graphical representations 206, of the electronic document. In some examples, the touchscreen gestures can be associated with a type, e.g., a positive touchscreen gesture 504 and a negative touchscreen gesture 506.

To that end, a type of the touchscreen gesture is determined. That is, based on the type of the touchscreen gesture, e.g., whether the gesture is a positive touchscreen gesture 504 or a negative touchscreen gesture 506, the workflow proceeds to an appropriate event. For example, for a positive touchscreen gesture 504, the workflow progresses to an Add Task event 508 or a Complete event 510. Additionally, for example, for a negative touchscreen gesture 506, the workflow progresses to an Archive event 512 or a Delete event 514.

Furthermore, a degree of the touchscreen gesture is determined. That is, based on the degree of the touchscreen gesture, e.g., a length of the touchscreen gesture, the workflow proceeds to an appropriate event. In some examples, the length of the edge is representative of the degree of the touchscreen gesture. That is, the greater the degree of the touchscreen gesture, the greater the length of the edge between the nodes representing the events. For example, for a positive touchscreen gesture 504 of a degree greater than the first threshold, and less than the second threshold, the workflow progresses to the Add Task event 508. For example, for a positive touchscreen 504 of a degree greater than the second threshold, the workflow progresses to the Complete event 510. Additionally, for example, for a negative touchscreen gesture 506 of a degree greater than the third threshold, and less than the fourth threshold, the workflow progresses to the Archive event 512. Additionally, for example, for a negative touchscreen gesture 506 of a degree greater than the fourth threshold, the workflow progresses to the Delete event 514.

To that end, from either of events 508 and 510, the workflow can precede to one of events 516, 518, 520. Specifically, a Priority event 516 includes initializing, or updating, by the user 105 a priority status, e.g., priority metadata, associated with the electronic document 502. A Due Date event 518 includes initializing, or updating, by the user 105 a due date, e.g., due date metadata, associated with the electronic document 502. An Assignee event 520 includes initializing, or updating, by the user 105 the assignee, e.g., assignee metadata, associated with the electronic document 502. In some implementations, the workflow can progress between any of the events 516, 518, 520. For example, from the Priority event 516, the workflow can progress to the Due Date event 518 or the Assignee event 520; from the Due Date event 518, the workflow can progress to the Priority event 516 or the Assignee event 520; and from the Assignee event 520, the workflow can progress to the Priority event 516 or the Due Date event 518.

Figure 6:
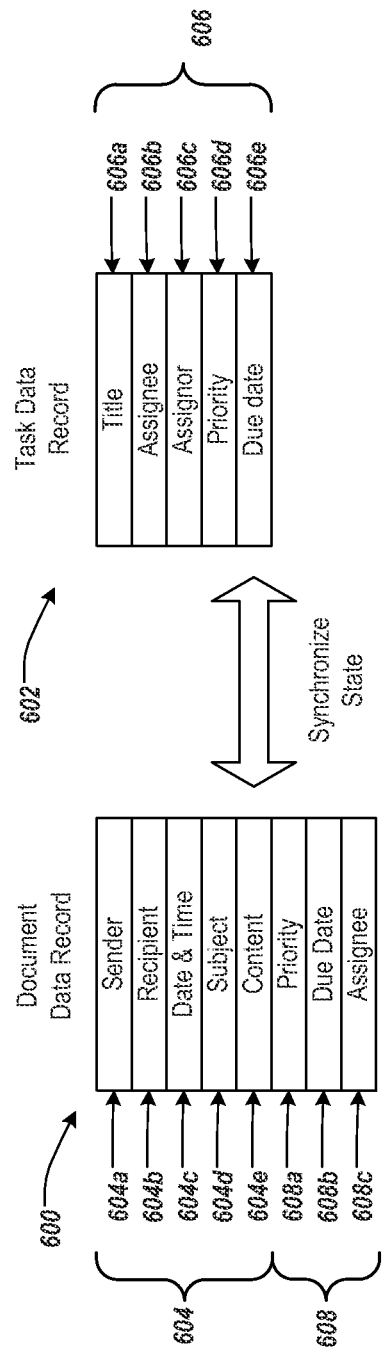
FIG. 6 graphically depicts a document data record and a task data record.

FIG. 6 graphically depicts a document data record (DDR) 600 and a task data record (TDR) 602. Specifically, the DDR 600 is associated with an electronic document, e.g., the electronic document represented by the graphical representation 206 or the electronic document 502; and the TDR 602 is associated with a task, e.g., the task represented by the graphical representation 320.

The DDR 600 includes fields 604a, 604b, 604c, 604d, 604e referred to as fields 604. The fields 604 are associated with electronic document metadata. For example, a sender field 604a includes data associated with a sender of the electronic document; a receipt field 604b includes data associated with a recipient of the electronic document; a date and time field 604c includes data associated with a date and time that the electronic document was transmitted; a subject field 604d includes data associated with a subject of the electronic document; and a content field 604e includes data associated with content, e.g., a body, of the electronic document.

The TDR 602 includes fields 606a, 606b, 606c, 606d, 606e referred to as fields 606. The fields 606 are associated with task metadata. For example, a title field 606a includes data associated with a title of the task; an assignee field 606b includes data associated with an assignee of the task; an assignor field 606c includes data associated with an assignor of the task; a priority field 606d includes data associated with a priority of the task; and a due date field 606e includes data associated with a due date of the task.

In some implementations, one or more of the fields 606 of the TDR 602 is populated with data associated with one or more fields 604 of the DDR 600. For example, the title field 606a can be populated with data associated with the subject field 604d of the DDR 600; the assignee field 606b can be populated with data associated with the recipient field 604b of the DDR 600; and the assignor field 606c can be populated with data associated with the sender field 604a of the DDR 600. In some examples, the title field 606a of the TDR 602 can be populated by the user 105, e.g., the title field 606a is "user-editable."

In some implementations, in response to creating the task, e.g., as described above, fields 608 can be added, e.g., appended, to the DDR 600. In some examples, the fields 608 are associated with the task, and the TDR 602. Specifically, a priority field 608a, a due date field 608b, and an assignee field 608c are added to the DDR 600. In some implementations, the fields 608 are populated with data associated with the fields 606 of the TDR 602. For example, the priority field 608a can be populated with data associated with the priority field 606d of the TDR 602; the due date field 608b can be populated with data associated with the due date field 606e of the TDR 602; and the assignee field 608c can be populated with data associated with the assignee field 606b of the TDR 602.

In some implementations, one or more of the fields 608 of the DDR 600 can be synchronized with one or more fields 606 of the TDR 602, e.g., by the server system 106 through the network 108. In some examples, synchronization between the fields 608 of the DDR 600 and the fields 606 of the TDR 602 can include updating one of the fields 606 or 608 based on changes in the corresponding field. For example, the priority fields 608a and 606d can be synchronized; the due dates fields 608b and 606e can be synchronized; and the assignee fields 608c and 606b can be synchronized.

Figure 7:
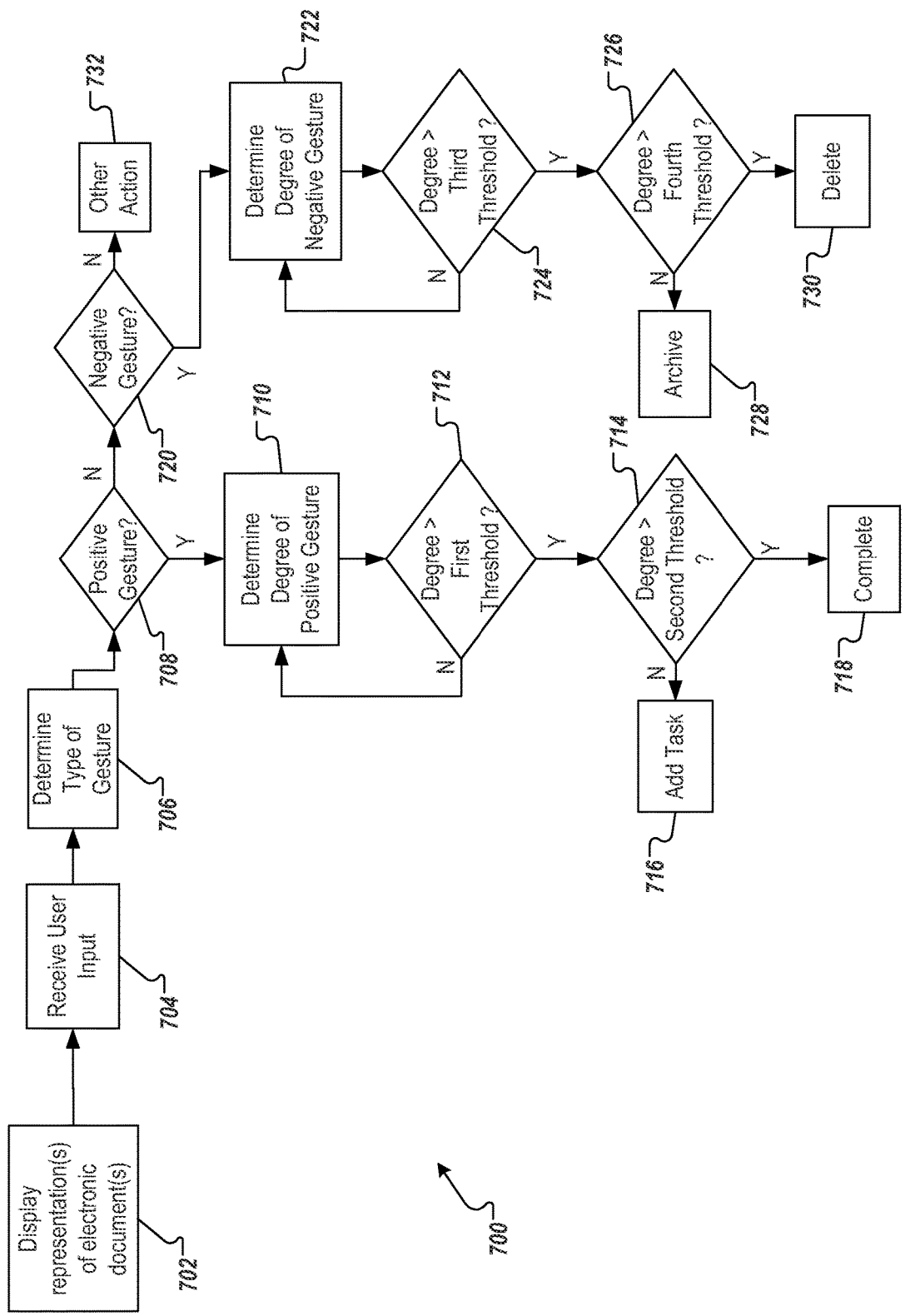
FIG. 7 depicts an example process that can be executed in accordance with implementations of the present disclosure.

FIG. 7 depicts an example process 700 that can be executed in accordance with implementations of the present disclosure. The example process 700 can be provided as one or more computer-executable programs executed using one or more computing devices. For example, the mobile computing device 102, the server system 106, or both can be used to execute the example process 700.

Graphical representations associated with an electronic document are displayed on a touchscreen display (702). For example, the graphical presentations 204, 206, 208 are displayed on the touchscreen display 104. User input to at least one graphical presentation is received (704). For example, a touchscreen gesture to the graphical presentation 206 is received. A type of the touchscreen gesture is determined (706). Specifically, a direction of the touchscreen gesture is determined relative to the touchscreen display. It is determined whether the gesture is a positive gesture (708). Specifically, it is determined whether the gesture is in a first direction, e.g., the touchscreen gesture from the first side 218 of the touchscreen display 104 towards the second side 220 of the touchscreen display 104.

In response to determining that the touchscreen gesture is a positive touchscreen gesture, the degree of the positive touchscreen gesture is determined (710). Specifically, a length of the positive touchscreen gesture is determined. It is determined whether the degree of the positive touchscreen gesture is greater than a first threshold (712). Specifically, the length of the positive touchscreen gesture is compared to the first threshold. In response to determining that the degree of the positive touchscreen gesture is less than the first threshold, the degree of the positive touchscreen gesture is determined again, at (710).

In response to determining that the degree of the positive touchscreen gesture is greater than the first threshold, it is determined whether the degree of the positive touchscreen gesture is greater than a second threshold (714). Specifically, the length of the positive touchscreen gesture is compared to the second threshold. In some examples, the second threshold is greater than the first threshold. In response to determining that the degree of the positive touchscreen gesture is less than the second threshold, an Add Task action element is displayed on the touchscreen display (716). For example, the Add Task action element 222 is displayed on the touchscreen display 104. In response to determining that the degree of the positive touchscreen gesture is greater than the second threshold, a Complete action element is displayed on the touchscreen display (718). For example, the Complete action element 224 is displayed on the touchscreen display 104.

In response to determining that the touchscreen gesture is a non-positive touchscreen gesture, it is determined whether the gesture is a negative touchscreen gesture (720). Specifically, it is determined whether the gesture is in a second direction, e.g., the touchscreen gesture from the second side 220 of the touchscreen display 104 towards the first side 218 of the touchscreen display 104. In some examples, the second direction is opposite to the first direction.

In response to determining that the touchscreen gesture is a negative touchscreen gesture, the degree of the negative touchscreen gesture is determined (722). Specifically, a length of the negative touchscreen gesture is determined. It is determined whether the degree of the negative touchscreen gesture is greater than a third threshold (724). Specifically, the length of the negative touchscreen gesture is compared to the third threshold. In response to determining that the degree of the negative touchscreen gesture is less than the third threshold, the degree of the negative touchscreen gesture is determined again, at (722).

In response to determining that the degree of the negative touchscreen gesture is greater than the third threshold, it is determined whether the degree of the negative touchscreen gesture is greater than a fourth threshold (726). Specifically, the length of the negative touchscreen gesture is compared to the fourth threshold. In some examples, the fourth threshold is greater than the third threshold. In response to determining that the degree of the negative touchscreen gesture is less than the fourth threshold, an Archive action element is displayed on the touchscreen display (728). For example, the Archive action element 402 is displayed on the touchscreen display 104. In response to determining that the degree of the negative touchscreen gesture is greater than the fourth threshold, a Delete action element is displayed on the touchscreen display (730). For example, the Delete action element 402 is displayed on the touchscreen display 104.

In response to determining that touchscreen gesture is non-negative touchscreen gesture, an other action is performed (732).

Figure 8:
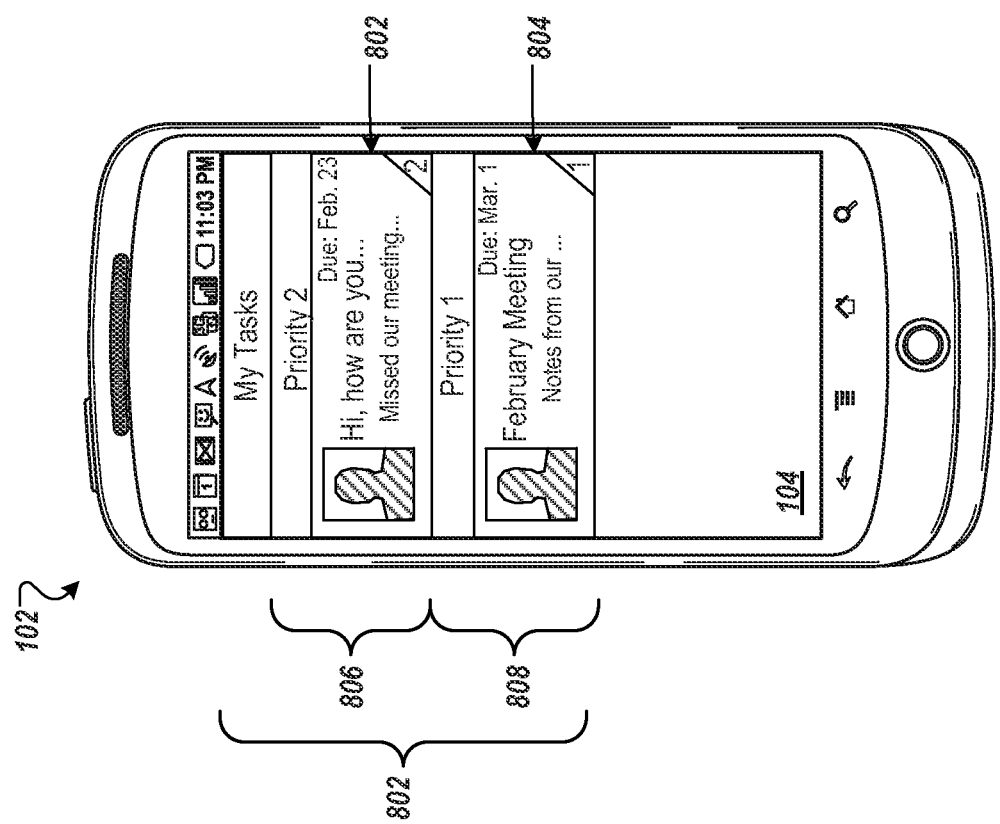
FIG. 8 depicts a graphical representation of a task inbox.

FIG. 8 depicts a graphical representation of a task inbox 800, similar to the task inbox 318 of FIG. 3C. Specifically, graphical representations 802, 804 of respective tasks, similar to the graphical representation 320, are displayed within the task inbox 800. Task sections 806, 808 can further be displayed within the task inbox 800. The task sections 806, 808 can be associated with section properties, e.g., metadata, that can include, for example, priority, due data and assignee. For example, the task section 806 is associated with the priority property having a magnitude of two, and the task section 808 is associated with the priority property having a magnitude of one. That is, for any task associated with the user 105, based on the priority associated with the tasks, the graphical representations 802, 804 of the tasks are displayed within an appropriate task section 806, 808. For example, the task associated with the graphical representation 802 is associated with a priority of two, and thus, is displayed within the priority task section 806; and the task associated with the graphical representation 804 is associated with a priority of one, and thus, is displayed within the priority task section 808.

In some implementations, properties of the tasks associated with graphical representation 802, 804 can be updated based on associating the graphical representations 802, 804 with a differing tasks section 806, 808 than what the graphical representation 802, 804 is currently associated with. For example, the user 105 can select one of the graphical representations 802, 804, e.g., providing a "press and hold" user input, and moved, e.g., by a "drag" user input, to a differing task section 806, 808, and subsequently completing the user input, e.g., providing a "release" user input. For example, the priority property associated with the task associated with the graphical representation 808 can be updated to a value of two by the user 105 providing input to associate the graphical representation 808 with the task section 806.

In some implementations, based on a type of event associated with the user input, a quick response user interface can be provided for display on the touchscreen display 104. For example, when the workflow proceeds to the Add Task event 508 of FIG. 5, the quick response user interface can be provided for display on the touchscreen display 104 based on the Add Task event 508. The quick response user interface includes one or more pre-populated responses that the user 105 can select for transmission to an entity. Additionally, in some examples, the pre-populated responses are state-specific context-aware quick responses. That is, the pre-populated responses are further based on a state of the event, e.g., the Add task event 508.

In some further implementations, two or more entities, can update the properties e.g., the properties of the DDR 600, the TDR 602, or both. For example, the TDR 602 can be stored by one or more remote repositories through the network 108, e.g., in the "cloud." Thus, the state of the TDR 602 can be considered a "shared" state, that is, any of the two or more entities can access the TDR 602 and adjust one or more properties of the TDR 602.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A method for taking at least one action on an email message among a plurality of email messages in a user interface comprising:
   rendering, by a computing device, the plurality of email messages associated with a mailbox in the user interface;
   detecting, by the computing device, user input on the email message;
   determining, by the computing device, that the user input is a first sliding gesture in a first direction;
   rendering, by the computing device, a depiction of a first action when a length of the first sliding gesture is less than a first threshold percentage of a dimension of a touchscreen display in which the user interface is displayed;
   rendering, by the computing device, an indication that the first action is performed upon completion of the user input when the length of the first sliding gesture is less than the first threshold percentage, wherein
   the first action on the email message is performed upon completion of the user input when the length of the first sliding gesture is less than the first threshold percentage; and
   fading, by the computing device, the graphical depiction of the first action when the length of the particular gesture is greater than or equal to the threshold percentage and the user input occurs in the first direction, wherein the second action is taken with respect to the email message in response to the user input being released from the representation of the email message when the length of the particular gesture is greater than or equal to the threshold percentage.

2. The method of claim 1, wherein the depiction of the first action is rendered within the email message.

3. The method of claim 1, further comprising rendering, a depiction of at least one second action within the email message when the length of the first sliding gesture is greater than or equal to the first threshold.

4. The method of claim 3, wherein the at least one second action comprises an additional action element and an undo action element.

5. The method of claim 3, further comprising:
   detecting, by the computing device, selection of the at least one second action upon completion of the user input on the email message; and
   performing, by the computing device, the at least one second action in response to selection of the at least one second action.

6. The method of claim 1, further comprising:
   determining, by the computing device, that the user input is a second sliding gesture in a second direction;
   rendering, by the computing device, a depiction of a third action when a length of the second sliding gesture is less than a second threshold;
   rendering, by the computing device, an indication that the third action is performed upon completion of the user input when the length of the second sliding gesture is less than the second threshold; and performing, by the computing device, the third action on the email message upon completion of the user input when the length of the second sliding gesture is less than the second threshold.

7. The method of claim 6, further comprising:
rendering a fourth action within the email message when the length of the second sliding gesture is greater than or equal to than the second threshold, wherein the fourth action is taken on the email message in response to the user input being released from the email message when the length of the second sliding gesture is greater than the second threshold.

8. A system for taking at least one action on an email message among a plurality of email messages in a user interface comprising:
a mobile computing device; and
an application executed by the mobile computing device, the application configured to cause the mobile computing device to at least:
render the plurality of email messages associated with a mailbox in the user interface;
detect user input on the email message;
determine that the user input is a first sliding gesture in a first direction;
render a depiction of a first action when a length of the first sliding gesture is less than a first threshold percentage of a dimension of a touchscreen display in which the user interface is displayed;
render an indication that the first action is performed upon completion of the user input when the length of the first sliding gesture is less than the first threshold percentage, wherein
the first action is performed on the email message upon completion of the user input when the length of the first sliding gesture is less than the first threshold percentage; and
fade the graphical depiction of the first action when the length of the particular gesture is greater than or equal to the threshold percentage and the user input occurs in the first direction, wherein the second action is taken with respect to the email message in response to the user input being released from the representation of the email message when the length of the particular gesture is greater than or equal to the threshold percentage.

9. The system of claim 8, wherein the depiction of the first action is rendered within the email message.

10. The system of claim 8, wherein the application further causes the mobile computing device to at least render a depiction of at least one second action within the email message when the length of the first sliding gesture is greater than or equal to the first threshold.

11. The system of claim 10, wherein the at least one second action comprises an additional action element and an undo action element.

12. The system of claim 10, wherein the application further causes the mobile computing device to at least:
detect selection of the at least one second action upon completion of the user input on the email message; and
perform the at least one second action in response to selection of the at least one second action.

13. The system of claim 8, wherein the application further causes the mobile computing device to at least:
determine that the user input is a second sliding gesture in a second direction;
render a depiction of a third action when a length of the second sliding gesture is less than a second threshold;
render an indication that the third action is completed upon completion of the user input when the length of the second sliding gesture is less than the second threshold; and
perform the third action on the email message upon completion of the user input when the length of the second sliding gesture is less than the second threshold.

14. The system of claim 13, wherein the application further causes the mobile computing device to at least:
render a fourth action within the email message when the length of the second sliding gesture is greater than or equal to the second threshold, wherein the fourth action is taken on the email message in response to the user input being released from the email message when the length of the second sliding gesture is greater than the second threshold.

15. A non-transitory computer-readable medium embodying instructions for taking at least one action on an email message among a plurality of email messages in a user interface that, when executed by a mobile computing device, cause the mobile computing device to at least:
render the plurality of email messages associated with a mailbox in the user interface;
detect user input on the email message;
determine that the user input is a first sliding gesture in a first direction;
render a depiction of a first action when a length of the first sliding gesture is less than a first threshold percentage of a dimension of a touchscreen display in which the user interface is displayed;
render an indication that the first action is performed upon completion of the user input when the length of the first sliding gesture is less than the first threshold percentage wherein
the first action is performed on the email message upon completion of the user input when the length of the first sliding gesture is less than the first threshold percentage and
fade the graphical depiction of the first action when the length of the particular gesture is greater than or equal to the threshold percentage and the user input occurs in the first direction, wherein the second action is taken with respect to the email message in response to the user input being released from the representation of the email message when the length of the particular gesture is greater than or equal to the threshold percentage.

16. The non-transitory computer-readable medium of claim 15, wherein the depiction of the first action is rendered within the email message.

17. The non-transitory computer-readable medium of claim 15, wherein the instructions further cause the mobile computing device to at least render a depiction of at least one second action within the email message when the length of the first sliding gesture is greater than or equal to the first threshold.

18. The non-transitory computer-readable medium of claim 17, wherein the at least one second action comprises an additional action element and an undo action element.

19. The non-transitory computer-readable medium of claim 17, wherein the instructions further cause the mobile computing device to at least:
detect selection of the at least one second action upon completion of the user input on the email message; and
perform the at least one second element in response to selection of the at least one second action.

20. The non-transitory computer-readable medium of claim 15, wherein the instructions further cause the mobile computing device to at least:
- determine that the user input is a second sliding gesture in a second direction;
- render a depiction of a third action when a length of the second sliding gesture is less than a second threshold;
- render an indication that the third action is completed upon completion of the user input when the length of the second sliding gesture is less than the second threshold; and
- perform the third action on the email message upon completion of the user input when the length of the second sliding gesture is less than the second threshold.

* * * * *